United States Patent [19]

Saxenmeyer

[11] Patent Number: 5,506,992
[45] Date of Patent: Apr. 9, 1996

[54] DISTRIBUTED PROCESSING SYSTEM WITH ASYNCHRONOUS COMMUNICATION BETWEEN PROCESSING MODULES

[76] Inventor: George Saxenmeyer, 303 Van Burger Rd., Owego, N.Y. 13827

[21] Appl. No.: 828,199

[22] Filed: Jan. 30, 1992

[51] Int. Cl.[6] .................................................. G06F 13/00
[52] U.S. Cl. ................... 395/800; 395/163; 364/230; 364/230.5; 364/230.6; 364/950; 364/950.1; 364/951; 364/951.02; 364/DIG. 1
[58] Field of Search .................................. 395/800, 200, 395/163, 325; 364/DIG. 1, DIG. 2, 230, 230.5, 230.6, 951

[56] References Cited

U.S. PATENT DOCUMENTS

| | | | |
|---|---|---|---|
| 3,983,538 | 9/1976 | Jones | 364/716 |
| 4,058,001 | 11/1981 | Li | 395/500 |
| 4,314,349 | 2/1982 | Batcher | 364/716 |
| 4,571,675 | 2/1986 | Stambaugh et al. | 364/200 |
| 4,593,351 | 6/1986 | Hong et al. | 395/800 |
| 4,633,431 | 12/1986 | Bar | 395/325 |
| 4,697,247 | 9/1987 | Grinberg et al. | 364/713 |
| 4,720,780 | 1/1988 | Dolecek | 364/200 |
| 4,739,474 | 4/1988 | Holsztynski | 395/800 |
| 4,807,184 | 2/1989 | Shelor | 395/425 |
| 4,839,851 | 6/1989 | Maki | 395/800 |
| 5,056,015 | 10/1991 | Baldwin et al. | 364/200 |
| 5,081,575 | 1/1992 | Hiller et al. | 395/325 |
| 5,086,498 | 2/1992 | Tanaka et al. | 395/200 |
| 5,146,428 | 9/1992 | Tanimura | 365/189.08 |
| 5,146,608 | 9/1992 | Hillis | 395/800 |
| 5,168,547 | 12/1992 | Miller et al. | 395/325 |
| 5,237,686 | 8/1993 | Asano et al. | 395/650 |
| 5,239,629 | 8/1993 | Miller et al. | 395/325 |

OTHER PUBLICATIONS

D. L. Slotnick et al., "The Solomon Computer," AFIPS Conference Proceedings, 1962, vol. 22, pp. 97–107.
Hillis, W. Daniel, "The Connection Machine," Twentieth Century, Jun. 1987, pp. 174–181.
Corcoran, Elizabeth, "Thinking of Machines," Scientific American Dec. 1991, pp. 140–141.

*Primary Examiner*—Alyssa H. Bowler
*Assistant Examiner*—Dzung C. Nguyen
*Attorney, Agent, or Firm*—Keck, Mahin & Cate

[57] ABSTRACT

An asynchronously concurrent matrix macroprocessor that consists of a substrate on which is carried an extended set of parallel-wired buses. An indefinitely large multi-dimensional rectangular array of substantially identical large scale integrated solid-state electronic modules each containing a plurality of ALUs are mounted on the substrate and communicate with each other via said extended set of parallel wired buses. The modules are located at the intersection nodes of said rectangular array with the set of parallel wired buses constituting congruent data and address buses. A control generates a unique location address for each node in the array, and a unique identifying address for each segment of external input data. A switch is contained in each module located at each node in the array for interconnecting data and address buses to route the information from a source node in the array to a target node. A static random access memory is included in each module for containing intermediate results and status information corresponding to each original input-identification address and to issue a target node address, based on the original input-identification address, for chaining modules together into preselected data flow itineraries, to perform a sequence of functional ALU operations to develop external output data from original input data so that multiple data streams can intermingle concurrently.

11 Claims, 8 Drawing Sheets

$AX^3+BX^2+CX+D = ((A^xX+B)^x X+C)^x X+D$ 5,506,992

DISTRIBUTED PROCESSING SYSTEM WITH ASYNCHRONOUS COMMUNICATION BETWEEN PROCESSING MODULES

FIELD OF INVENTION

This invention relates to an autonomous, asynchronously-concurrent matrix macroprocessor which functions as a definitive data-flow machine.

BACKGROUND

Prior art processors have been developed which take advantage of pipelining and other processing strategies. However, no processor has yet been developed which will truly perform as an autonomous, asynchronously-concurrent matrix macroprocessor as described herein.

OBJECT OF INVENTION

The object of the present invention is to provide a macroprocessor in the form of a definitive data-flow machine. The macroprocessor functions by pre-loading an instruction program in execution specification format: logical, arithmetic, shift; logical, shift; logical . . . etc. These static instructions are mapped into the subject matrix of identical VLSI chips, so that the data operands to be processed will traverse prearranged paths of static instruction sub-sequences in pipeline fashion. In the general case, there will be many concurrently active paths, which may share common segments by the merging of paths as required, followed by re-separation downstream. Thus, common subroutines need not be physically replicated in order for separate concurrent-data streams to use them independently. And since the several concurrent-data streams are being processed asynchronously, the inevitable path conflicts can be resolved instantaneously by arbitrary priority assignment.

The topography of the processing matrix is such that multiple external data inputs can feed a communal data-flow path, as desired, by entering and exiting the path at the appropriate points. The implied need to maintain the separate identities of the individual data streams is provided for by carrying the associated external input/output address of the individual data streams in parallel on a congruent, dual path.

Contemporary, state-of-the-art VLSI circuit technology can provide the circuit-count and pin-out capacities to achieve the aforementioned collection of functional requirements on a singular highly-replicated CMOS-family VLSI chip.

DESCRIPTION OF PREFERRED EMBODIMENT OF INVENTION

Figure 1:
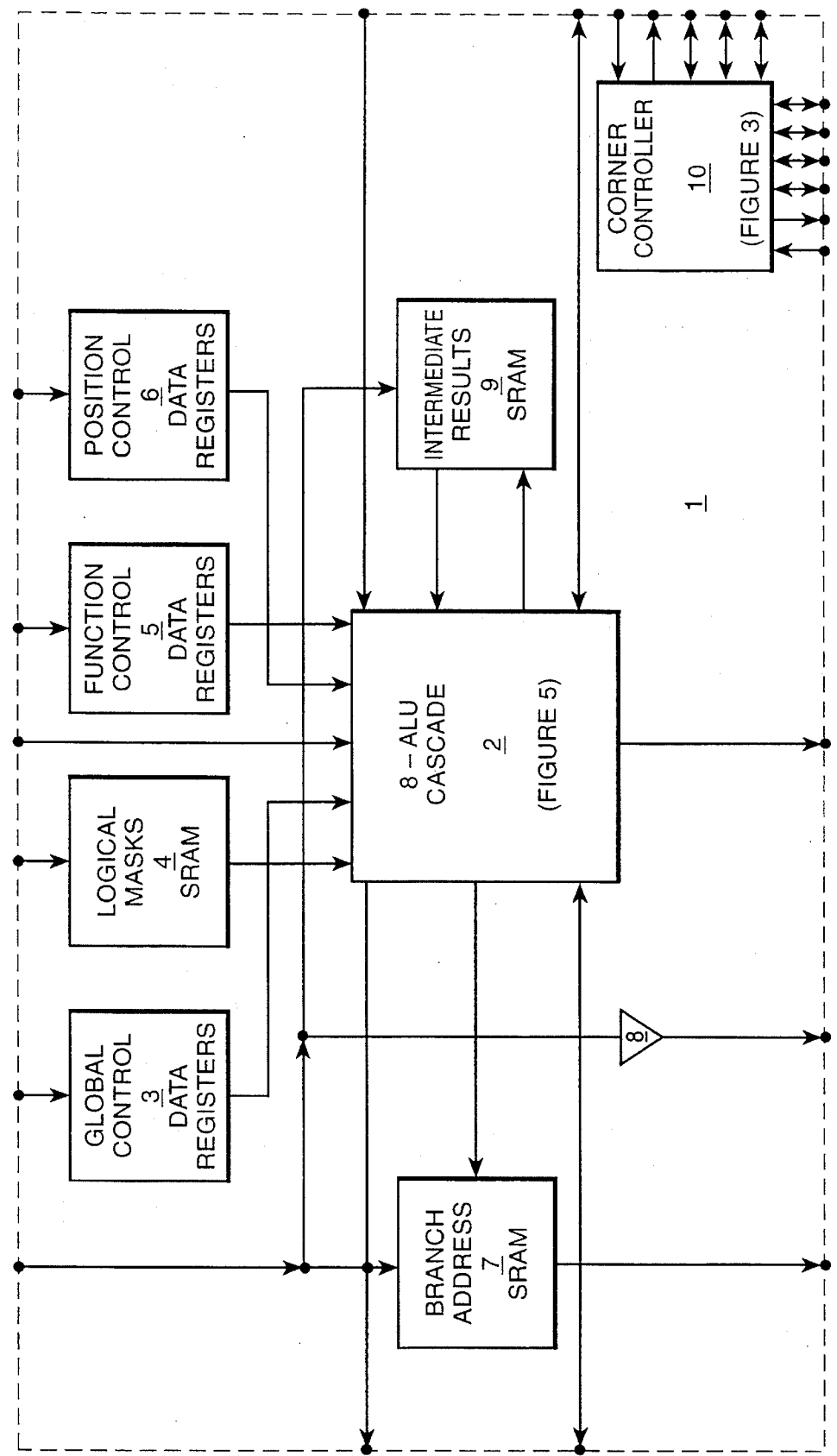
FIG. 1 shows schematically in block diagram the layout of a VSLI ASIC chip according to the present invention.

Referring to the drawings in detail, FIG. 1 shows a VLSI (Very Large Scale Integration) ASIC (Application Specific Integrated Circuit) chip 1 contains a set 2 of full-function ALUs (Arithmetic/Logical Units) in cascade, a set of pre-loaded static data registers 3 for global control of the ALU set 2; a pre-loaded SRAM (Static Random Access Memory) 4 for storage of a set of logical data masks for each ALU of the set of ALUs 2 for each possible source of external input data; a set of static data registers 5 for the pre-loaded storage of function control values for each ALU of the ALU set 2; another set of pre-loaded static data registers 6 for independent positional control of the ALU set 2; a pre-loaded SRAM 7 for storage of result-dependent alternative target addresses for each possible branching condition for each ALU of the ALU set 2 for each possible external input source; a unity gain logical buffer amplifier 8 to propagate the identification tag (ID) of each possible external input source to the target or succeeding chip 1 in the physical matrix of identical chips 1; another SRAM 9 to store the intermediate results of each ALU operation of the ALU set 2 for each possible source of original external input data, for re-entrant shared usage of the ALU set 2 by all external input data streams requiring processing by a common sub-sequences of combined ALU operations, equivalent to a conventional stored program instruction subroutine; and a set 10 of cornering controls to interconnect one group of data and address signal transmission buses to another orthogonal or perpendicular group of data and address buses whose purpose is to transfer data and addresses from a source chip 1 to a target chip 1 to enable sequential data processing operations by linking chips 1 together in a directed path or itinerary, so that the original external input source data becomes processed by its traversal of the relevant sequence of statically stored ALU operations as defined beforehand by the programmer of the data-processing application, wherever in the physical matrix of identical chips 1 that particular program's instruction sub-sequences have been located during the pre-loading operations. The various identified components are interconnected as illustrated in FIG. 1 to perform as described.

Figure 2:
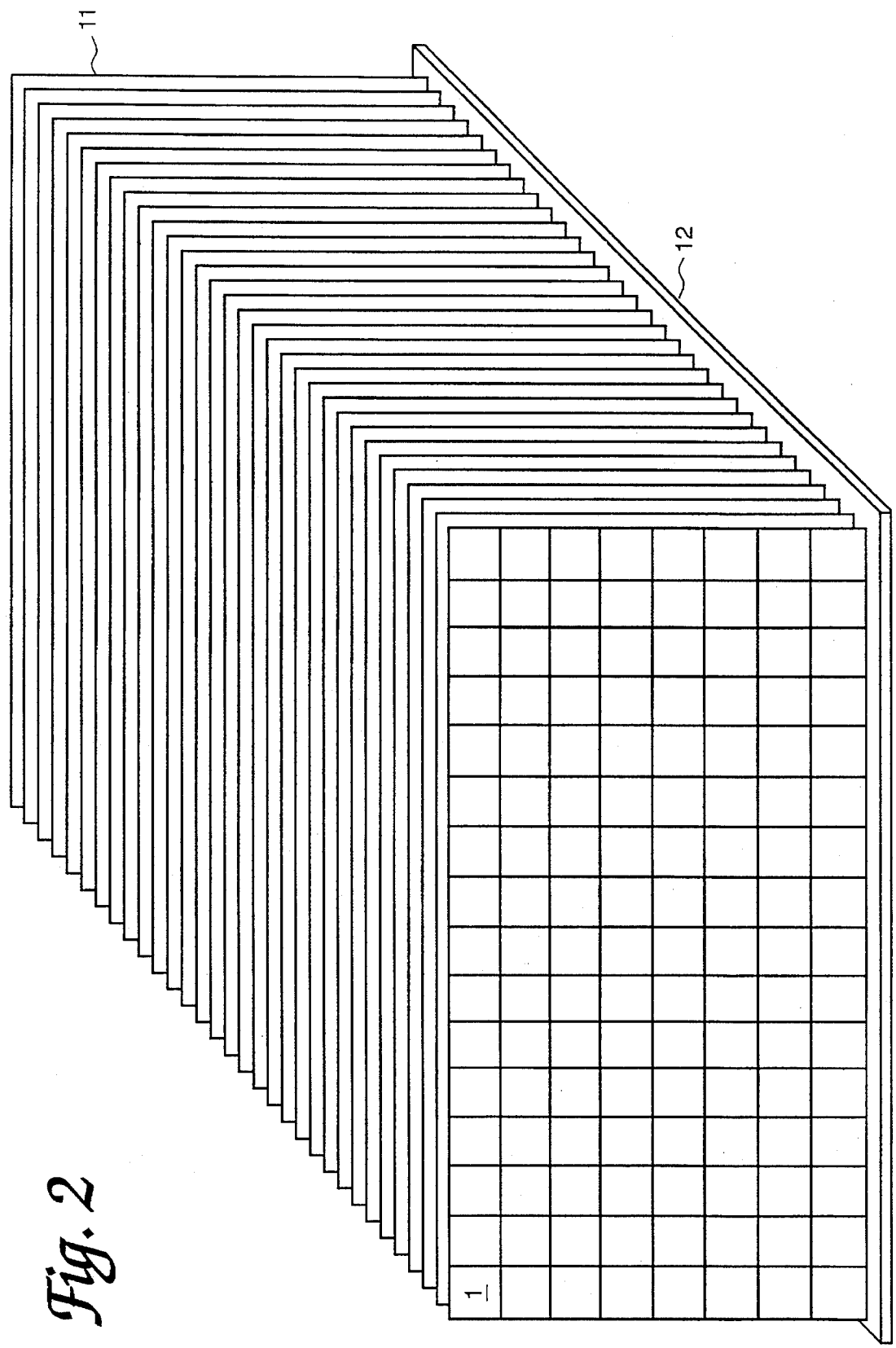
FIG. 2 shows in perspective the mounting of circuit cards containing ASIC chips to a third level board.

FIG. 2 illustrates one method by which the ASIC chips 1 are physically distributed by the use of conventional card-on-board packaging technology, using a multiplicity of second level circuit cards 11, interconnected to one or more third-level boards 12.

Figure 3:
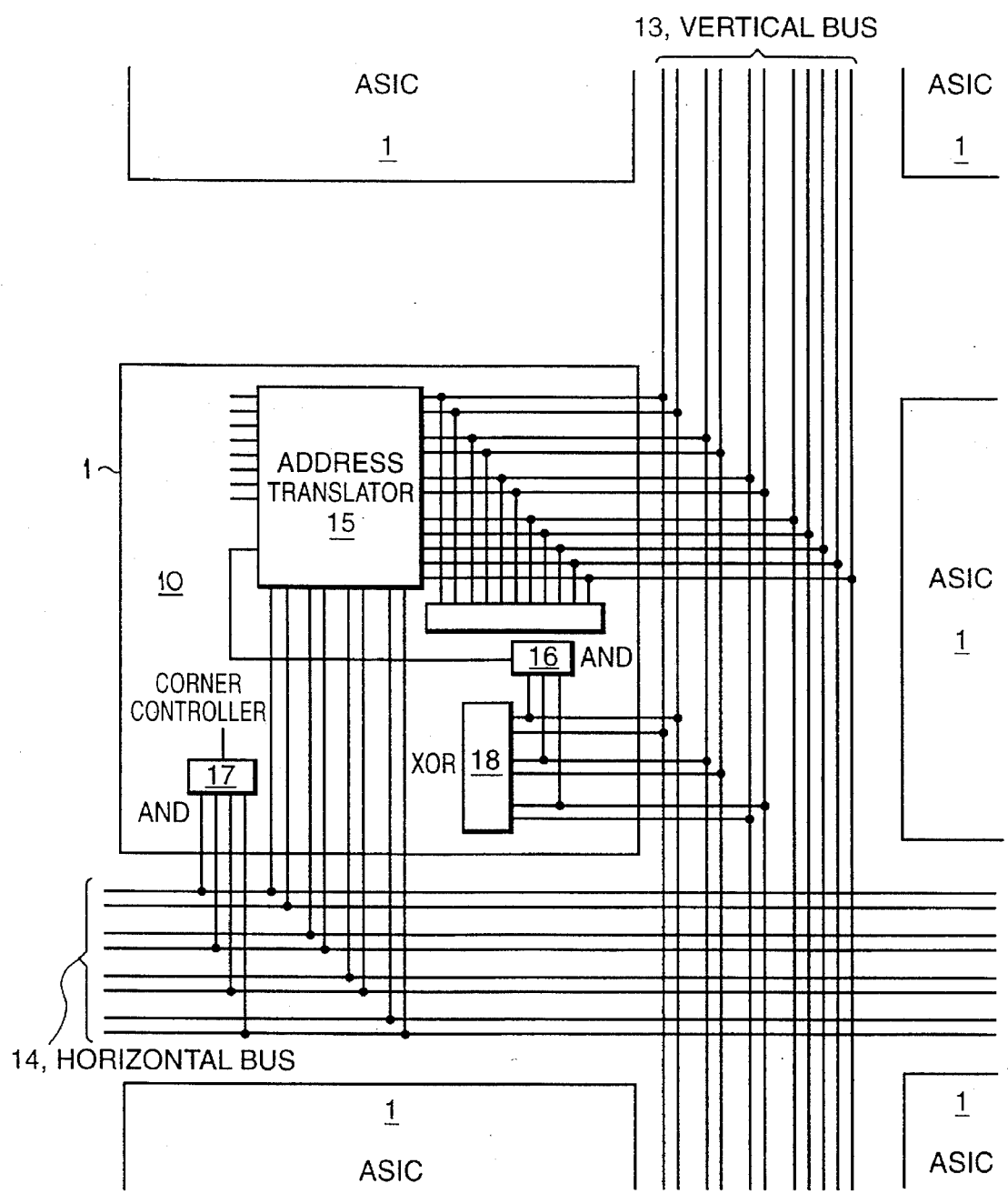
FIG. 3 shows schematically orthogonal bus connections to chips.

FIG. 3 shows the two groups of orthogonal buses, one group 13 connected to the source chip 1 of an inter-chip transfer, and the other group 14 connected to the target chip 1. The source chip 1 and the target chip 1 are located anywhere on the same second level package 11, or are located on the corresponding group of source buses on any interconnected second-level package 11 on the same third level package 12. Multiple third level packages 12 are interconnected with each other by the same type of interface used for actual external input/output data.

The bus cornering controls 10 in FIG. 3 consist of an Address Translator 15 which converts the transfer address of the target chip 1 from its original source-chip format to target-chip format when it traverses the cornering chip 1 which interconnects the two orthogonal bus groups 13 and 14 to provide a continuous path for the group of buses from source to target. The transfer of address and data values from source chip 1 to target chip 1 is self-timed and dependent on the actual physical length of the L-shaped path of the transfer. (Transfers between physically adjacent chips 1 have the shortest propagation delay; transfers between chips 1 located physically at diagonally opposite corners of the first and last second level package have the longest propagation delay; transfers between second level packages have variable propagation delay, depending on the physical offset separating them on the third-level package); AND circuit 16 is uniquely identified by discretionary wiring on the second level package to differentiate it from the others which share the source-format address bus to which it is connected, by utilizing bi-polar bus signalling; for example, a source-format address bus shared by 8 chips 1 contains 6 signal lines, for transmission of a 3-bit bi-polar address segment, with each of the 8 chips 1 decoding its own physical location relative to the other seven. Correspondingly, after address translation from source to target format by the corner chip 1, another AND circuit 17 decodes the relative physical location of each chip 1 sharing the common target format address bus. SRAM 7 (see FIG. 1) on the source chip 1 shares the source address bus interface with the Address Translator 15. XOR check circuits 18 verify the validity of the bi-polar signal values on the source bus for each chip 1 responding to its own address; the target format address optionally selects multiple horizontally contiguous target chips 1 by double signalling on the respective address bit-pairs, so that all signalling values are sometimes valid and thus uncheckable.

Figure 4:
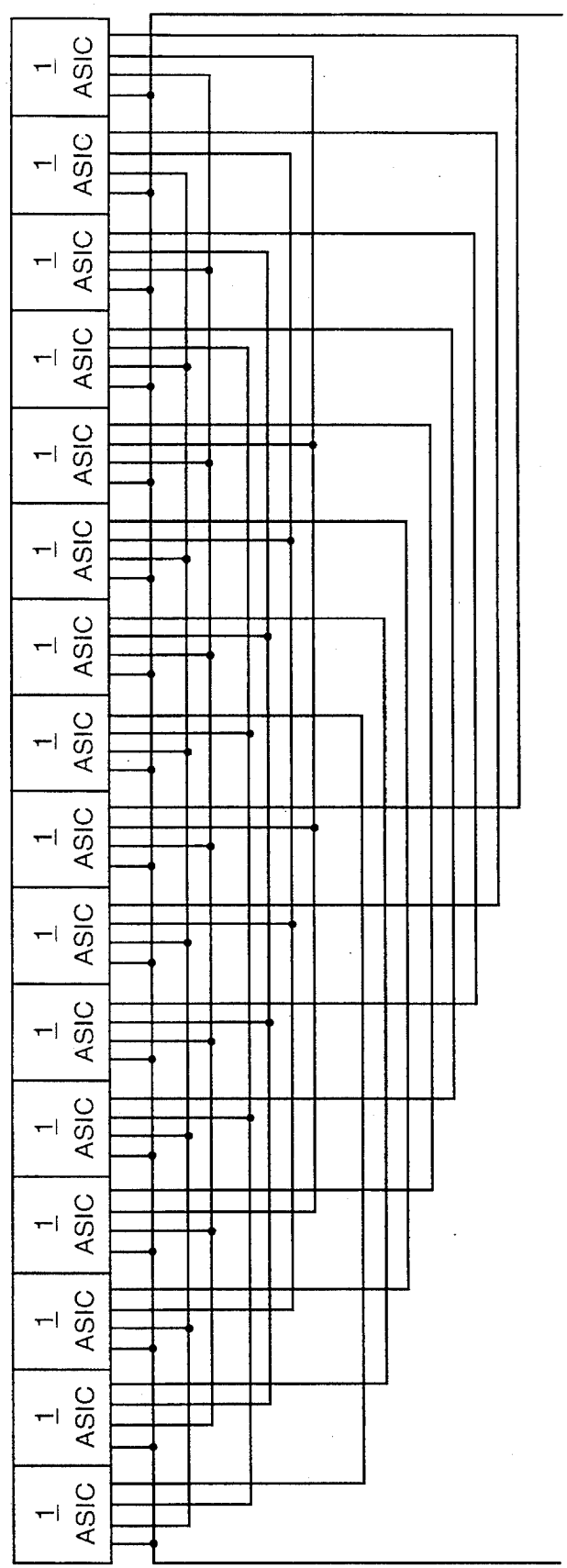
FIG. 4 shows schematically data transfer buses interconnected with chips.

FIG. 4 gives an example of how 16 target chips 1 have their input data transfer buses interconnected in a stagger-interleaved form, to accommodate multiple path-widths, e.g. single, double, quad, octad, etc.; optional path-width is selected by the corner chip 1, when it decodes the target address for re-transmission.

Figure 5:
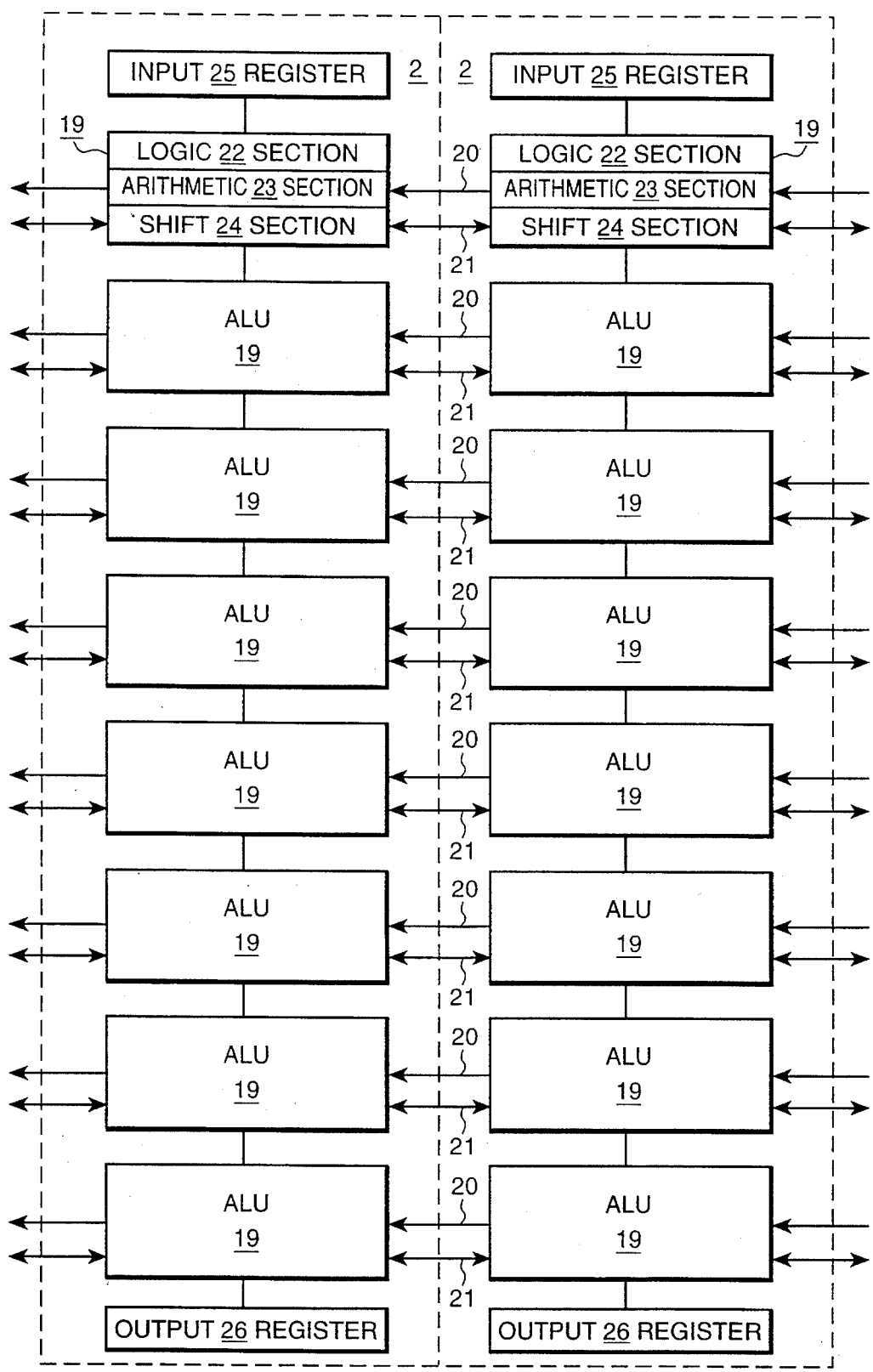
FIG. 5 shows schematically the cascading of individual ALUs.

FIG. 5 shows how the individual ALUs 19 of set 2 are cascade connected with each other on an individual chip 1, and how the ALU cascades 2 of adjacent parallel chips 1 are interconnected to propagate Arithmetic Carry 16 and Right/Left Shift signals to form multiple-width data paths, as determined by the values stored in each respective chip's 1 Global Control Registers 3. Each ALU 19 of set 2 consists of a cascade of Logical 22, Arithmetic 23, and Shift 24 sections. Each ALU set 2 also contains Input Registers 25 and Output Registers 26.

Figure 6:
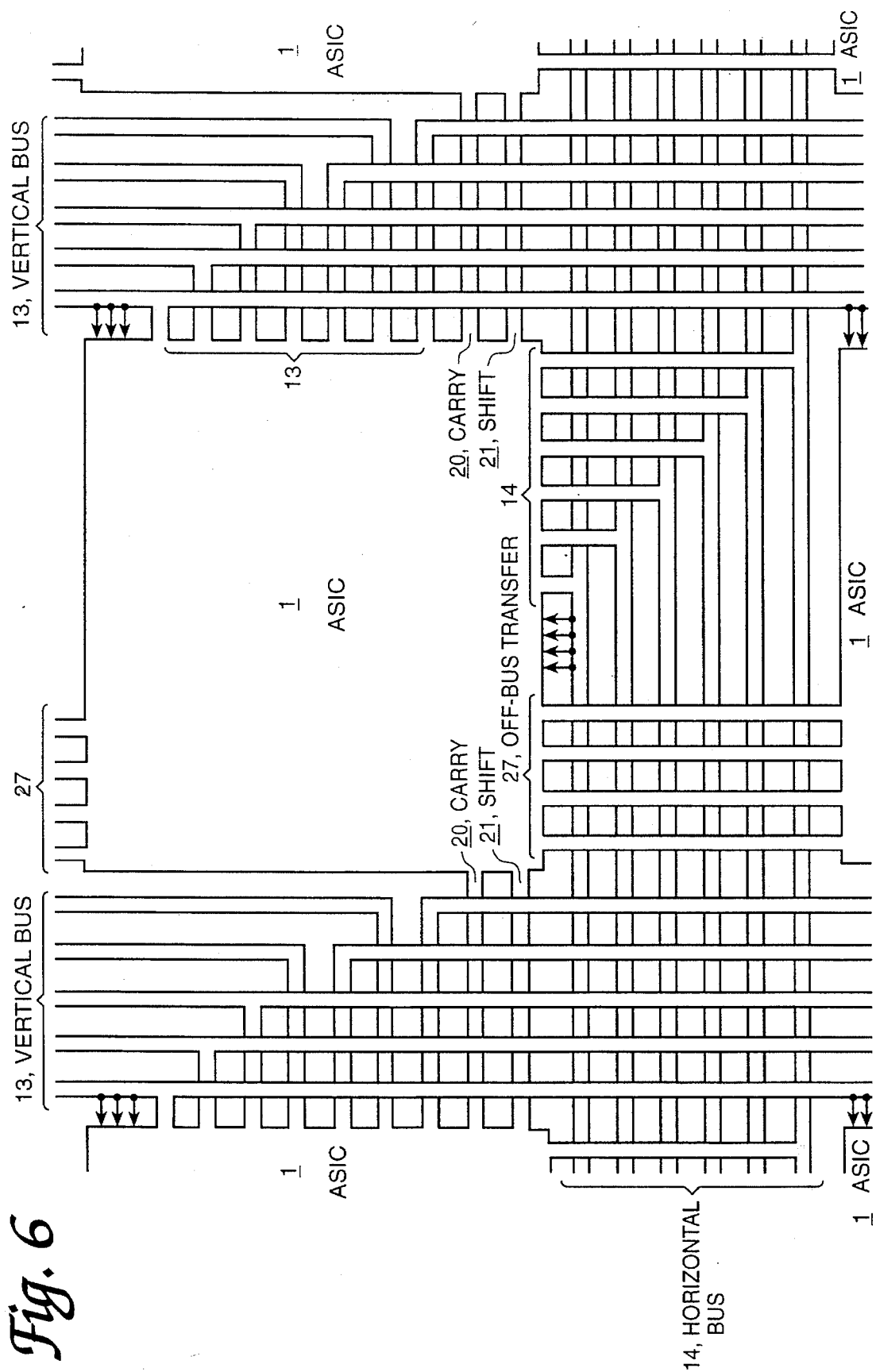
FIG. 6 shows schematically interconnection of two orthogonal bus groups with a chip.

FIG. 6 shows how the two orthogonal bus groups 13 and 14 connect any chip 1 to its orthogonally adjacent chip, including Carry 20, Shift 21, and Unidirectional Off-bus Transfers 27.

Figure 7:
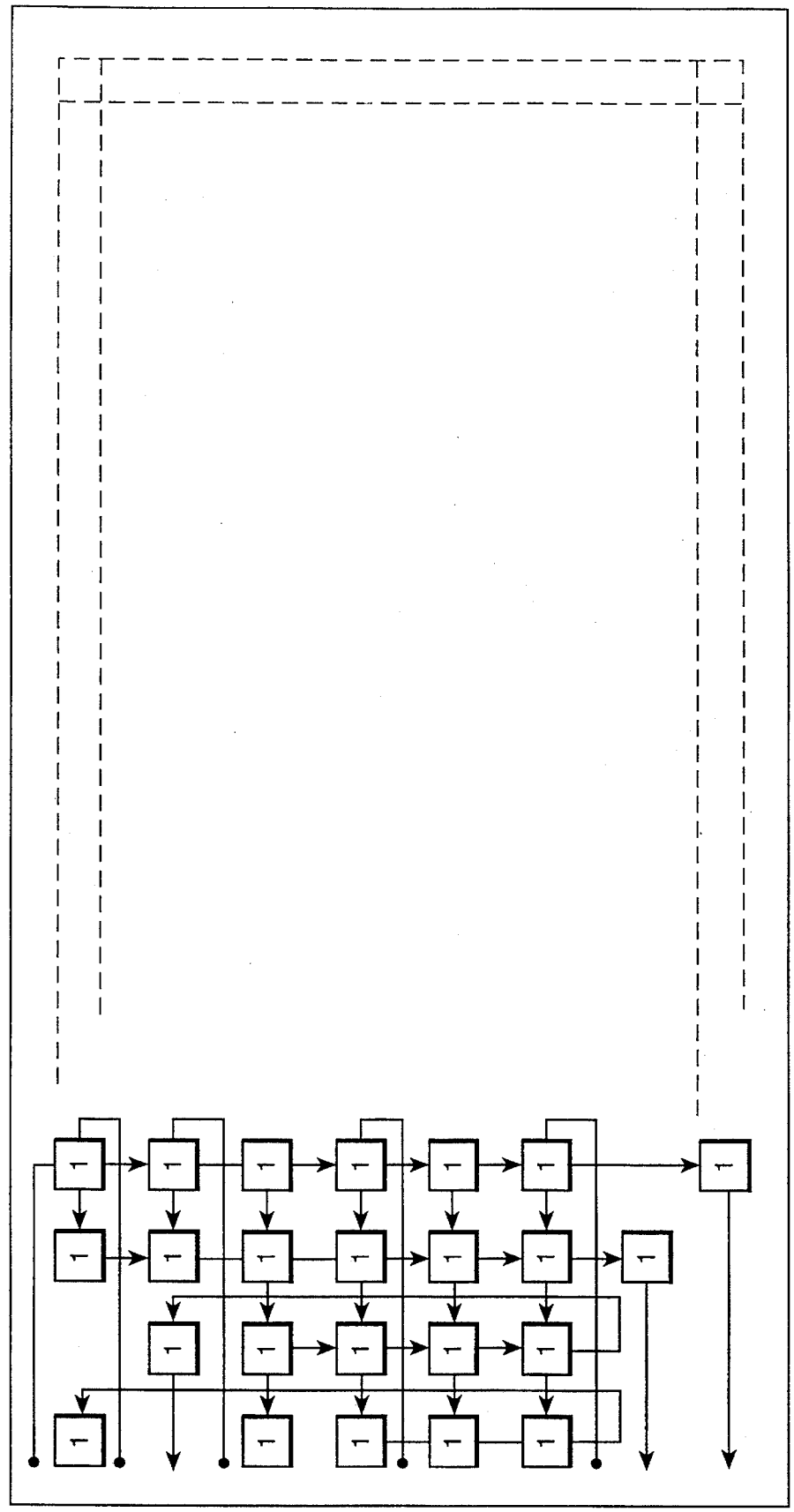
FIG. 7 shows schematically the calculation of a polynomial.

FIG. 7 gives an example of the calculation of the polynomial $AX^3+BX^2+CX+D$ by utilizing some 24 chips 1, with the restriction that chips 1 spanning multiple width segments of the data path must be horizontally adjacent for interconnection of intervening Carry and Shift signals.

Figure 8:
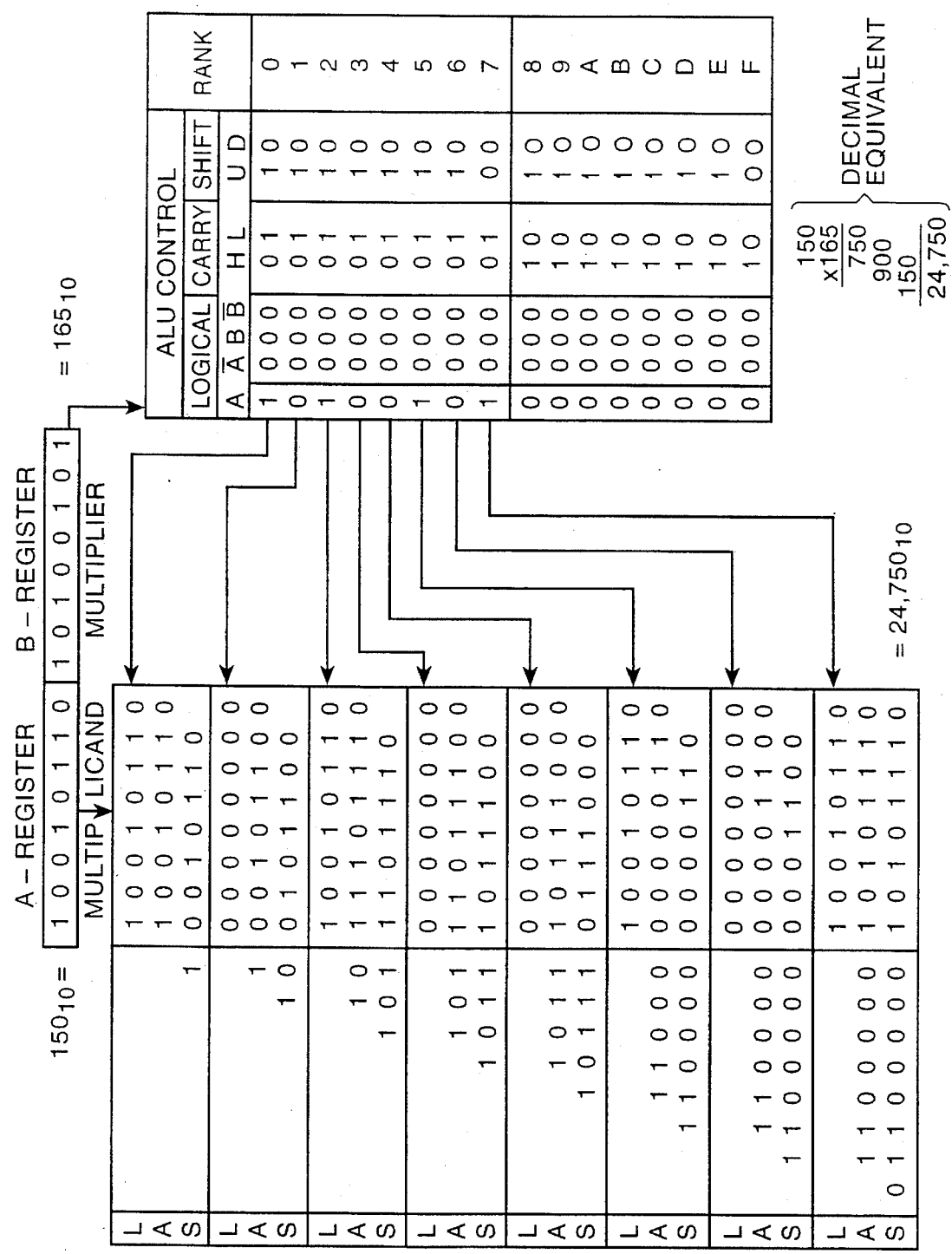
FIG. 8 is a schematic showing of typical control values and binary arithmetic for a multiplication.

FIG. 8 gives an example of typical control values and binary arithmetic for the multiplication of two single-precision factors to produce a double-precision product, for the case of $150_{10} \times 165_{10}$, as $10010110_2 \times 10100101_2 = 0110000010101110_2$ $(24,750_{10})$. Other subroutines, not shown, are used to convert between the Binary Coded Decimal (BCD) input/output values and the Binary values used in the calculation; these radix-conversion subroutines are program coded once, for common use by all the data streams which require them.

FIG. 8 shows how two horizontally adjacent chips are coupled together to produce an immediate 2-byte arithmetic product from 1-byte multiplier and multiplicand factors. The right-hand (low-order) chip has the multiplier factor value loaded into its B-Register from elsewhere; its Global Control specifies a Multiplication operation, which causes the B-register contents to be used as the "A-true" column of its ALU Control array, with the effect of selectively adding the multiplicand factor directly from the A-register to the developing product. The Multiplication operation is thus performed.

The conventional intermediate left-shifting is done by overriding the ALU CONTROL Left Shift column with a fixed "11111110" value generated by Global Control for the Multiplication operation code. The resulting arithmetic product value is thus produced by having the Multiplicand factor successively "falling through" the double-width cascaded ALUs, with the intermediate results "spilling over" into the left-hand (high order) byte by sporadic left shifts and adder carries, as they occur.

All shifting and arithmetic carrying is signalled in "dual-rail" (concurrent True and Complement) form, so that the progression of the bit-value signals through the 2-wide/8-high configuration of 8-bit-wide ALUs is self-timed by the eventual "settling out" of the complementary signal values on the two rails.

Thus, the elapsed time of the entire Multiplication operation is the shortest possible time duration consistent with the actual switching delays intrinsic to the particular physical circuit "hardware" employed. Consequently, the subject invention eliminates the need for synchronous "clocking" which is otherwise required to remove the timing "skew" (between parallel-operating circuits) caused by naturally occurring transit and propagation time-delay variations. To impose rigid synchronization among 4,096 logically identical but physically unique VLSI chips, distributed onto 32 pseudo-randomly physically displaced circuit cards, would cause intuitively obvious and catastrophically severe performance degradation, not to mention horrendously complex timing controls that would definitely not be regularized.

The subject invention avoids these complication by designing the various circuit functions in such a manner that contemporary logic switching events can occur concurrently, with their "natural", individual chain-delay timings as they "happen". Time-dependent and interference-sensitive concurrent operations literally "wait" for each other as required.

The present invention functions in a way to provide a viable alternative where previously there were nonexistent alternatives to the conventional Von Neuman style of ever-more-complex electronic computer architectures with their common "genetic" defect of executing programmed instructions one-at-a-time from common storage entities that are shared with operand data. To be sure, that conventional approach has certain unique advantages, such as computation of executable instructions "on the fly", as well as compilation and assembly of symbolic programming "code", but such things can be considered as self-generated and self-defeating additional complexities which in turn "feed on themselves".

The subject invention's statically programmable instruction path network circumvents these complexity factors by providing an entirely separate form of instruction storage, beginning at the micro-instruction level and then moving the data through that static network of "micro-instructions" in much the same manner as railroad trains share a common trackage network by adopting commonly-accepted automatic block switching controls and so-called "rules of the road". And just as the locomotives and railroad cars are interchangeable, so are the chips and cards of the subject invention.

It is to be noted that the pre-loaded control information, which represents the equivalent processing instructions of a conventional stored program, is optionally loaded into chip 1 locations pre-assigned by a self-loading operation sequence which self-destructs upon completion, or alternatively by a cross-compiler program running on a conventional data processing system, operating either in off-line batch mode or directly attached in on-line conversational mode.

The preferred embodiment consists of 8 cascaded 8-bit-parallel ALUs (Arithmetic-Logical Units), with each ALU statically controlled by the preloaded contents of internal registers and RAM (Random Addressable Memory) arrays, to preselect the desired ALU functions and provide predetermined (constant) data values in place. These static predetermined values, which represent the functional equivalent of the conventional stored program, can be pre-loaded through the functional flow-paths by unspecified external means (e.g., an independent control micro-computer) or optionally by separate flow-paths internal to the replicated common chip (which could permit concurrent alteration of the functional flow-paths and also control definitions dynamically during the progress of full functional operation of the processing matrix).

As an adjunct to this latter case, the common chip includes an internal self-testing function, which operates whenever the immediate chip is otherwise idle (not engaged in functional operation) or, optionally, at fixed intervals (in terms of the number of cycles of use or duration of elapsed time since the previous test cycle) with functional operation suspended until completion of the test cycle in progress. Any individual chip failing its self-test contains the address of its immediate dynamic contents, as well as its sequential position in the composite data stream, in its own control registers.

With a 1½"-square CMOS VLSI chip, containing several hundred thousand circuits and several hundred I/O pins, the chips would have to be spaced on at least 2" centers, setting the practical capacity limit of the $2^{nd}$-level card or daughter board to a full binary matrix of 8×16 chips (a total of 128 chips per card). The $3^{rd}$-level mother board could carry a practical maximum full-binary count of 32 cards (e.g., 16" on ½" centers). Thus, the complete three-dimensional physical matrix of identical VLSI chips would contain 4,096 ($2^{12}$=128×32) total chips. Assuming 99-percent maximum practical utilization, there would be 40+ unassigned chips available for dynamic substitution for any chips failing their self-test, so that system degradation would be extremely graceful. And, since all chips are identical, both localization of the failure and its repair would be intrinsically conclusive, with no aliasing and no boundary equivocation.

This 3-level-packaged physical processing matrix could be integrated into some complete end-use system, either as an autonomous subsystem or under the direct control of one or more other parts of the total system—a choice to be made by the system designer.

As mentioned, the preferred embodiment of the invention is a singular highly-replicated VLSI chip from the CMOS family of circuit technologies, although some other circuit technology could be substituted, based upon intrinsic superiority considerations. Similarly, the width and depth of the on-chip ALU matrix could be chosen as smaller or larger than eight, and the number of chips on the card could be varied and need not complete a full binary matrix. Also, the number of cards mounted on the mother board could be some number other than 32, at the discretion of the designer.

However, because full-binary matrices are the most efficient in terms of capacity and effectiveness, they are chosen for the preferred embodiment. This choice provides 4,096 chips as mentioned, each of which contains an identical ALU array that is 8 bits wide and 8 ALUs deep. In combination, the total capacity of the complete 32-card preferred embodiment is 8 bits×8 ALUs× 8 rows×16 columns×32 cards=$2^{18}$, or 262,144 (i.e. approximately ¼ megabit) positions of fully-articulated ALUs.

In the overview, the comparably-sized ¼-megabit RAM chip has now been successively eclipsed by the 1-meg, the 4-meg, and the 16-megabit chips. Because of the vast difference in functional complexity, the packaging scales-of-size are obviously not the same, and they need not be. The preferred embodiment is a unique closed set with one member, in consideration of the practical limitations of circuit delay skew, chip I/O pin-counts, and card-and-board wirability. Thus, the preferred embodiment will be chosen for a detailed sizing study, prerequisite to final design and manufacture of the object VLSI chip.

The LOGICAL part of the ALU will consist of a four-way AND/OR of the canonical logic functions of two variables ($\overline{XY}$, $\overline{X}Y$, $X\overline{Y}$, and XY). Four bits of control data per ALU rank (times eight, per chip) predetermine which of these four functions participate in the output (the extremes are NONE= NULL and ALL=ONE). For one ALU, the raw circuit count is four three-way ANDs and one four-way OR-all times eight (total of 32 ANDs and 8 ORs). Since it is prudent and practical to dual-rail the basic ALU, the second rail would conversely require 32 three-way ORs and eight four-way ANDs. Both rails would contribute identical two-stage delays.

Now, since both True and False LOGICAL outputs are available, the ARITHMETIC function (including 8-bit carry-lookahead) is completely expressible as logical minterms so it, too, reduces to simple AND/ORs. The final SHIFT function has four states: leftward one position (10), rightward one position (01), straight through (11), and de-gate (00)—except for the ends where, again, AND/ORs suffice.

If the chosen circuit family is NAND logic, and the ARITHMETIC function (which will use all possible minterms for dual railing) is implemented in negative logic, then each of the full ALUs on the chip produces only three units of delay. Including the input and output latches, the input-to-output pin-to-pin delay will be nominally less than 30 unit delays. At the typical state-of-the-art stage delay of one nanosecond, the composite delay inverts to a chip operating frequency of about 35 megahertz for 8 ALUs in tandem (280 megahertz equivalent per ALU).

This means that an 8×8 multiplication would require less than 30 nanoseconds, and a 16×16 multiplication less than 120 nanoseconds. Recalling that there are 4,096 identical chips in the total matrix, and assuming a conservative 50 percent duty cycle, we see that 8 ALU operations per 30 nanoseconds time 2,048 concurrently operating chips yields more than 500 ALU operations per nanosecond.

Assuming that emulation of a S/370 uniprocessor, for example, results in three decimal orders of magnitude of performance degradation, the resultant is a 500-MIPS S/370 equivalent, with 256 bytes of half-duplex 35-megahertz I/O porting.

Recompiling the S/370 object code to its host's native-language equivalent, within the capacity limits of the 32K-ALU matrix, should gain at least a full order of decimal magnitude performance improvement—to 5 thousand MIPS, let's say—at the OS/2 task level. The ultimate performance level would require conformal programming in the preferred embodiment, presumably for some forms of recursive and/or cascaded matrix operations, running at its natural speed asymptotic to an actual million MIPS. In this performance regime, real-time video image processing, global weather forecasting, and analytical monitoring of particle physics experiments become achievable. This invention proposes to open up a completely new era in electronic computation, which it will dominate exclusively. This invention will be a true landmark patent, being the most radical improvement in computer system organization since the Charles Babbage concept of the mid-19th century.

At the highest level of packaging, the preferred embodiment of the subject invention may be visualized as a book of 32 single-sided pages, each of which is a daughter card containing a physical matrix of 128 LSI chips in an 8×16 pattern, with the mother board being the spine of the book. Each chip on any card can communicate with itself, with any other chip on the same card, or with any chip on any other card in any row of the corresponding column—as selected by an 8-bit address and a MODE signal issued by the sending chip under its own internal control.

This address is echo-checked at both ends of the transfer, so that each chip maintains its own functional integrity. In addition, each chip has a built-in, exhaustive, internal, self-checking algorithm which is performed automatically whenever the chip is otherwise idle. This self-checking algorithm is interruptable at the end of the current self-test cycle whenever the chip is required for functional use: it resumes automatically when the chip lapses back into idle state. When the self-checking algorithm detects an internal fault, the failing chip suspends its functional operation, transfers its control state and immediate data contents to a predetermined unused chip somewhere else in the system, bypasses its assigned function inputs to this substitute chip, and then goes dormant until such time as it is physically replaced by a good chip during routine system maintenance.

Since there would be only a relatively few idle chips available, each substitute would serve as the target for a large number of active chips, for which it could only serve as first replacement. Either the routine maintenance interval must be short enough to anticipate secondary failures or the substitution algorithm must be expanded to accommodate chained substitution, preferably from a common pool of substitutes, and particularly as in cases of physically inaccessible operating locations which preclude hands-on repairs.

The macro-processor embodied in the subject invention provides 256 eight-bit bytes of I/O porting at either end of each of the eight rows on each of the 32 cards. Each of these I/O bytes can communicate directly with any of the 16 ALU chips which share its particular row on its particular card. In real terms, assuming a 1-nanosecond-delay circuit family, the natural repetition rate for that interfacing chip would be in the range of 25–30 megahertz (say 28), which inverts to 35 megabytes per second for each of the 256 available bytes, for an aggregate maximum of nearly 9 GBps (gigabytes per second) or about 70 gigabaud.

Even at 70 gigabaud, it is safe to assume that the subject macro-processor will be generally I/O-bound. Previously unattainable applications—such as real-time optical image processing, real-time global meteorological modeling, network-integrated air traffic control, continuous analysis of experimental particle physics phenomena—now become possible.

| | | | | | |
|---|---|---|---|---|---|
| | | COMMON CHIP I/O SIGNAL PIN-COUNT REQUIREMENTS | | | |
| QTY | SIGNAL/BUS NAME | CIO | CONNECTION | FORMAT | RAIL POLARITY |
| 8 | A-DATA IN | C | 2-phase echo chkg | Byte | Positive |
| 8 | B-DATA IN | C | 2-phase echo chkg | Byte | Positive |
| 64 | Program Loading | I | Bridging | 8 Bytes | Positive |
| 11 | Vertical Address | C | Multi-point | Byte | V dual, H pos |
| 8 | Horizontal Address | C | Multi-point | ½ Byte | Dual |
| 8 | A-data Out | C | 2-phase echo ck'g | Byte | Positive |
| 8 | B-data Out | C | 2-phase echo ck'g | Byte | Positive |
| 8 | 2-byte data out | C | 2-phase echo ck'g | Byte | Positive |
| 8 | 4-byte data out | C | 2-phase echo ck'g | Byte | Positive |
| 8 | 8-byte data out | C | 2-phase echo ck'g | Byte | Positive |
| 8 | Location Address | I | Bridging | ½-Byte | Positive |
| 16 | Carry In | I | Point-to-point | Byte | Dual |
| 16 | Carry Out | O | Point-to-point | Byte | Dual |
| 16 | Left-hand Shift | C | Point-to-point | Byte | Dual |
| 16 | Right-hand Shift | C | Point-to-point | Byte | Dual |
| 207 | Subtotal | | | | |
| 16 | Off-card Address | C | Multi-point | Byte | Dual |
| 5 | Card Location | I | Bridging | 5-bit | Positive |
| 288 | Subtotal (89 I, 16 O, 123 C) | | | | |
| 27 | Strobes or Check Bits | C | Point-to-point | Ctl Sig | Pos or Neg |
| 255 | Total I/O Signal Pins | | | | |

The chip is organized as a cascade of eight 8-bit full-function ALUs, with buffer registers for the input to the first ALU and the output from the eighth ALU. Each ALU consists of a logical function which performs any of the 16 possible canonical terms of two variables—$\overline{A}B+A\overline{B}=A$ XOR B (the exclusive OR), $\overline{AB}$, $\overline{A}B$, $A\overline{B}$, and $AB$—in all possible combinations. These combinations are selected by a 4-bit binary code, each bit of which selects one of those four terms, which are then dot-ANDed together to produce the output value. For example: $A\overline{B}+AB=A$ (alone), $\overline{A}\overline{B}$=NULL, and $\overline{AB}+\overline{AB}+AB=$ A+B (the inclusive OR). Independent logical operations on all 8 bits separately would require the use of all 8 ALUs on the chip if this were an isolated requirement. Each of the 8 ALUs thus has access to the input B-value, with each successive A-bit gated directly through all preceding ALUs.

The LOGICAL function is followed immediately by an 8-bit-wide Full ADDER with end-to-end (8-bit) Carry Look-Ahead, to permit horizontal coupling of up to 8 contiguous ALUs with an acceptable carry-ripple delay in a 64×64 multiplication arrangement (which would occupy almost an entire card). The ADDER is followed immediately by an 8-bit parallel SHIFTER with right-, left-, no-SHIFT, or NULL capability, as selected by a 2-bit code, once for each of the 8 ALUs.

Complementation for substraction is accomplished prior to the ADDER by inverting the A-input in the LOGICAL function and accessing the B-input directly at the ADDER. The only operation function differentiation required by the ADDER itself is to denote whether it is low-order, high-order, neither, or both. This requires only two bits of control, for a total of 8 bits per ALU, the standard size of all the registers on the chip. Each ALU can also address an on-chip 256-byte storage array by using the B-value to address the array, as determined by the value of that ALU's bit in an Array Select control register.

Each of the conventional ALU branching functions also has its own selection register—again, one bit for each ALU in turn. Each chip can only branch to one alternate receiving chip in addition to the next normal address contained in a second 256-byte array that is selected by the A-data's own input I/O location address, predetermined by fixed jumper wiring on the card (by row: 3 bits) and at each card socket on the board (0–31:5 bits). By a separate network of address buses, the original I/O identity of each byte of A-data follows that data byte through its entire flow-path, input to output. This makes it possible and practical for different data inputs to share common subroutines without losing their individual identities.

The on-card chip-to-chip interconnection busing is selected by an 8-bit address with an unusual format:

| $X^4$ | $X^3$ | $X^2$ | $X^1$ | $X^0$ | $Y^2$ | $Y^1$ | $Y^0$ | |
|---|---|---|---|---|---|---|---|---|
| X | X | X | X | X | 0 to 1 | 0 to 1 | 0 to 1 | to card rows 0–7, binary coded top to bottom |
| X | X | X | X | 0 | Y | Y | Y | to chip at column and row intersection, 1 column wide (byte) |
| X | X | X | 0 | 1 | Y | Y | Y | to selected column and row intersection, 2 columns wide (half word) |
| X | X | 0 | 1 | 1 | Y | Y | Y | to selected intersection 4 columns wide (full word) |
| X | 0 | 1 | 1 | 1 | Y | Y | Y | to selected intersection. 8 columns wide (double word) |

The horizontal portion of the address selects one of the four bytes of chip data output to interleave the busing as required to accommodate the immediate width of the data output (1,2, 4, or 8 bytes in parallel).

Since the Next Chip Address is pre-loaded, chip-by-chip, an additional Address Mode bit is also preloaded into one of the control bytes to select which of the next two address output bytes is active. One of these is bridge-connected to the Vertical Address Bus column-by-column, with the row (Y-address) in bi-polar format, so that only the chip in the corresponding row will respond to its prewired address value. This chip is the cornering location; it inputs the predetermined Y-address and the true-value X-address, and outputs only the bipolar X-address of the targeted 1, 2, 4, or 8 chips selected by outputting ones (1's) on both the true and false lines of the respective low-order address bits so that the correct number of adjacent chips will respond to "wide" addresses on a single common address bus. If the next address is off-card, it is routed to an 8-bit bipolar Card Address bus which is board-wired to all 32 cards. Since off-card addressing is less frequent, the imposition of additional propagation delay will not significantly degrade overall performance.

Address transmission is gated by signals on two control lines: Strobe and Echo. The Strobe is sent out with the Address, which is in bipolar form. All chips listen for a valid bipolar address. When the transients have settled out, all address bits will simultaneously pass an 8-bit XOR for only the selected chip, which then responds on the Echo line. The sending chip then degates its address and its strobe. When end-of-strobe is detected by the addressed chip, it in turn drops its echo, returning the bus to service.

Finally, the Vertical address is chained through the eight chips in its respective column so that the uppermost chips can exert priority by preventing lower chips from outputting their addresses until the bus is freed from above. Since the usual data transfer path is vertically downward, the longer paths will tend to originate from the upper chips of the column, but the priority is actually arbitrary (which makes it absolute and fail-safe).

The data transfer is a 4-phase process, as follows: 1) The sending chip outputs the true data value on a common 8-bit bus; 2) The receiving chip inverts this value, thus outputting ones (1's) on the remaining lines; 3) The sending chip then detects all ones and degates its own ones; 4) The receiving chip checks the zeroes to verify that it registered the correct data value, which it signals to the sending chip by degating its complement value; 5) When the sending chip has detected all zeroes, it releases the bus. Thus, the bus is completely tested, and so is the transferred value.

The preferred circuit technology for the LSI chip would be one or another of the high-density, high performance CMOS circuit families, with several hundred thousand on-chip circuits and several hundred I/O pins per chip. The power dissipation (and input) per chip is assumed to be on the order of 80–100" mW each at 5V. A single 5-volt power supply with a nominal capacity of 100 amperes, with conventional power distribution and voltage regulation, implies a total power dissipation for the 32-card subsystem of 400–500 watts within about half a cubic yard/meter. This arrangement is certainly amenable to conventional convection cooling, implying extended component life. Other choices of circuit technology families and other more exotic ambient environments may require more extensive packaging provisions, but the preferred embodiment as detailed above may be packaged in conventional single-sided cards with conventional surface wiring such as Multiwire (R) and surface-printed circuit plane power distribution.

The entire chip complement for the subject subsystem (macroprocessor) is 8×16×32=4,096 (or $2^{12}$ chips, each containing eight 8-bit ALUs, for a total of 32 KB or 256 Kb of ALU). A rough cost estimate, based upon an installed chip cost of less than $100 each, thus comes to substantially less than half a million dollars. Replacement parts inventory requirements include one part number each for the chip, the card, the board, and the power supply. And, taking advantage of packaging symmetry, the requirements for cables and jumpers would also be minimal. In addition, all copies of the macroprocessor subsystem would be physically identical (no optional features), with any and all personalization accomplished by internal programming. Any customer with multiple installations could freely substitute parts within and among several "boxes", with no need whatever to differentiate between them physically. The overall effect then is a data processing center that more closely resembles a telephone central office, in both appearance and maintainability. However, unlike a telephone central office, the skill and training levels of the maintenance personnel could be extremely casual with only one part number for each component type.

Almost all of the board wiring, as well as most of the card wiring, will be either point-to-point between contiguous sides of adjacent chips, or parallel bused row-and-column. With the limited number of printed-circuit crossovers required, the main determinant for the number of equivalent printed-circuit signal-wiring planes would be aggregate wire-counts and wiring channel capacity.

The interconnection logic of the subject invention is organized around exhaustive sets of one-byte (8-bit) buses, some of them multi-point and some point-to-point, as each bus application requires.

The simplest of all is the B-bus, of which there are seven per column (112 per card), which connect vertically adjacent chips within each column (colloquially known as "elephant parade" or "daisy chain"), with the "B" output from the bottom of each chip in the upper seven rows to the top of the downward adjacent chip's "B" input. The top-row "B" inputs and bottom-row "B" inputs may optionally be used to daisy-chain one or more columns and/or cards together, to logically extend the height of the affected columns: the extreme case would be to daisy-chain all 32 cards together, column-by-column, in 16 parallel or one or more helical open or closed loops. There is also a corresponding array of A-buses with the same characteristics as the B-buses, to avoid the need for explicit addressing of downward adjacent transfers. Also, this would free the addressable horizontal transfer buses for concurrent use without interference.

Addressable transfers between non-adjacent chips or between cards are routed by a grid of vertical and horizontal address buses. The vertical address format has six bipolar lines for card-prewired selection of each chip's row location into an internally-ANDed three-line Local Address input. All chips in the corresponding row of all 32 cards are thus prewired to the same binary-coded row-number values respectively. For example, all 16 chips in the top rows of all 32 cards are prewired to the "000" code, etc., on up to "111" for the bottom rows.

The remaining five bits of the Vertical Address Bus byte are single-ended signals, which select the column(s) of the addressed chip(s), and also simultaneously denote the data-transfer pathwidth, differentiating 16 single-column paths, 8 even-and-odd adjacent pairs of 2-byte paths, 4 modular-adjacent quads of 4-byte paths, or finally two modular-adjacent 8-byte paths. The receiving column(s) are designated by the respective 4, 3, 2, and 1 leftmost of the above five bits, with the first bit to the immediate right of these always carrying a "0" value. The remaining bit(s) on the right are "filled" with "1" values, with one "1" signalling 2 bytes of data-transfer path-width, and so on—up to three right-hand "1" values. The two remaining values (01111 and 11111) identify I/O operations on the corresponding left and right ends of the addressed row.

The Horizontal address format is therefore 4-bit bi-polar binary, using eight lines, a specific different four of the eight being prewired to a 4-input internal AND on each chip of the row. This decodes the original binary value of its own column identity. For a 2-byte path-width, both True and False values of the low-order bit are asserted, in order to select both the xxxx0 and the xxxx1 columns.

In a similar fashion, both values of the second-to-low-order bit are additionally asserted (xxxx1111) to denote a 4-byte pathwidth, with all four chips of the addressed quad responding, and finally, with six trailing "1" values in combination with the leading xx ... designating selection of the corresponding eight chips on either the left- or right-hand half of the selected row on the card.

Each chip thus has four alternative Data Transfer Bus I/O pinouts, one of which is multi-point and wired to all 16 chips in the row for 1-byte transfers, another of which is wired to one or the other interleaved even and odd bytes for 2-byte transfers. Four-way and 8-way interleaving accommodate the 4-byte and 8-byte transfers, respectively. Each chip selects the proper one of these four buses on a basis of monitoring the number of simultaneously asserted True and False low-order address-bit values. These four buses, the corner chips in the "sending" column(s) and receiving row, perform the required translation of the Horizontal Address from 5 bits to 8 bipolar lines, with any of the chips on the card capable of performing the cornering function. In the special case of a transfer within the same row, the sending chip will also be the "corner"; in the case of a transfer within the same column, the receiving chip will also be the "corner".

Finally, the Data Transfer Buses, both Vertical and Horizontal, are bi-directional. Each chip on its assigned Data Transfer Bus has both a sender circuit and a receiver circuit wired to each of its I/O pins for these buses. Each of these sender/receiver pairs, with any required re-inversion (depending on circuit family), forms a logical latch without any additional logic required to perform the set and reset functions.

Initially, the transmission of a transfer address holds the sender/receiver latches in the selected path "reset" until the bus clears. Eventually, both the sending and receiving chips detect "all zeroes", unless there is a stuck-at-"1" failure somewhere in the path. On two selected control lines paralleling the data path, the two path-end chips signal "clear" to each other. When the sending chip detects "he's clear, and I'm clear", it gates out the data value in True form, along with a third control line which strobes the data. When the receiving chip detects "end of data strobe", it gates out the binary complement of the received data value on the remaining lines of the bus byte. When the sending chip in turn receives this "echo", it detects "all ones" and degates its True value by holding the latches at its end of the bus for those bits reset. However, the sending chip will retain the transmitted value internally in a register.

It then reasserts the strobe to reset the True bits in the receiving chip's output latches. When the True lines then go to "0", the sending chip XOR-checks the complement value (still on the bus) from the receiving chip against its own internal True value. If this check is successful, the sending chip degates its strobe again to signal the receiving chip that it got the correct data value. The receiving chip then resets its complementary (inverted) value off the bus and degates its echo strobe, which in turn signals the priority controls on the address buses that the transfer is complete. The bus is then released for reuse.

It is apparent that every card will support numerous concurrent data transfers, as long as they do not require conflicting use of the same column or row. Thus, each column and row performs its own autonomous priority control, asserted for the column by the active sending chip and for the row by the active receiving chip. Coincident bus requests are resolved arbitrarily by the uppermost sender (implying the longest vertical path, primarily downward) and the leftmost receiver (the one with the lowest column number value).

The concluding functional capability of this common-use chip is its built-in internal self-test. This function is automatically invoked whenever the subject individual chip is otherwise idle (neither actively operating on or transferring data nor waiting out a bus request). Any chip which detects an internal failure lapses into a substitution mode in which it automatically transfers all of its current values of control state and data content to a pre-designated substitute chip, which may be on any card on the board (as designated by a pre-loaded address value in a control register).

Intuitively, many chips will share the same replacement, so only the first failure can be accommodated. However, over the span of any reasonable maintenance interval, the binary probability of second failures designating the same replacement is negligible. Parenthetically, off-card chip addressing is limited to one of the eight chips within the corresponding column of any of the 32 cards, under the control of an Off-card Address control signal originating on the sending chip. Since the ensuing transfer does not require any horizontal address or data buses, it uses a dedicated set of upwardly daisy-chained address and data buses, with the top row outputs of all 16 columns on all 32 cards bused together, respectively, on the mother board. Because off-card transfers are relatively infrequent, the daisy-chaining and card-to-card signal transmission will not degrade overall sub-system performance substantially (even though they are individually significant) in terms of additional delay time.

In the preferred embodiment, each LSI chip contains eight 8-bit-wide ALUs, each with complete conventional ALU capacity, versatility, and function. Thus, on one chip, it is possible to perform an ungated, unclocked, 8-by-8-bit multiplication, with eight bits of the product coming out the "bottom" and the other eight bits out one "side" or the other (depending upon which direction the partial product is shifted through the bank of eight ALUs). Both directions of shifting are self-consistent, which may be used to functional advantage in "wider" multiplications with a larger-than-8-bit multiplier and/or multiplicand.

Division operations may be performed conversely, with the quotient coming out the left-hand "side", the remainder coming out the "bottom", and the low-order half of the dividend coming in on the other "side".

Floating binary or floating hexadecimal operations can be composed, as well, by combining multiplication division, addition, and subtraction in contiguous chips of the matrix, as determined by the functional requirements of the particular algorithm chosen for the operation. For conventional matrix arithmetic, composite "macro" operations can be programmed to perform the desired matrix functions as efficiently as the performance versus capacity tradeoffs permit.

Recursive arithmetic functions may be performed by "looping" two or more chips together with the counting performed in on-chip 8-bit registers (which permit an immediate maximum count of 256). Squaring the maximum count requires three 8-bit counters in a cooperative arrangement, e.g. (255×256)+256, to permit arbitrary intermediate values of count. This form of count expansion can be extended indefinitely, as required.

In summary, with an available matrix of $2^{15}$ (32,768) 8-bit wide ALUs, it is possible and practical to program extremely complex data-processing jobs in a completely pipelined, autonomous fashion. One interesting special case that comes to mind is the emulation of the IBM System/370 instruction set, which would perform at an estimated 100 to 1,000 times "real time", compared to an actual System/370 using the same family of circuit technology.

If the system/370 object code were recompiled into "native" code for this macro-processor, it would execute at a rate 10 to 100 times faster than the above example. And if the defined System/370 job were rewritten to take full advantage of the unique capabilities of the subject invention, an additional performance improvement factor of 10 to 100 would be achieved, for an aggregate performance improvement factor of 10,000 to 100,000 (again, compared to a "real" System/370, optimally designed in the same family of circuit technology).

By sacrificing the low-order bit of the row segment of the Vertical Address, an Address mode bit can be included within the standard 8-bit address value. Eliminating the $Y_3$ bit limits the row address to four possible values. It is useful to imply the $Y_3$ value as opposite to that of the sending chip; thus, even rows can only branch to odd rows, and odd rows only to even. With the above change in address format, the differentiation between on-card and off-card Transfer Addresses can be denoted by the value of a redefined $8^{th}$ address bit. This change enables the immediate Transfer Address to select both on-card and off-card data transfers explicitly and intermixed.

And since the data transfer destination is determined by the earliest branching ALU of the eight on the transferring chip, the data transfer target would then be any of half of the chips on any card.

A second advantage is that the macro-processor can now be made to operate synchronously, by the addition of a two-step, four-phase timing clock, running at nominally ⅔ of the asynchronous, to accommodate +50% combined on-chip transit and chip-to-chip propagation delays. Assuming an input-pin-to-output-pin chip-transit delay of 30 one-nanosecond unit delays and a (15+7)×2= 44 inches maximum on-card diagonal transmission distance (at 4"/ns=11 ns), the synchronous clock speed would be the reciprocal of 61.5 ns, or 16.26 MHz. On any given clock step, half of all the chips ($2^{11}$=2,048) would be actively processing data, representing 8 ALUs/chip×2,048/61.5 ns=266 ALU operations per nanosecond (273,000 MIPS), which inverts to 3.75 picoseconds per ALU cycle. State-of-the-art circuit packaging might possibly improve performance to a million MIPS, but with an extremely unfavorable cost differential, just to gain marginal performance improvement, and at the penalty of expanding the $3^{rd}$ level package size and heat from a quarter of a cubic meter and 500 watts, convection-cooled, to a frame size capable of dissipating many kilowatts.

Generally, the argument for exotic packaging has been based on the attractiveness, and often the necessity, of crowding millions of circuits as close together as possible in order to minimize propagation delays and skews and still somehow be able to pump out the resulting concentrated heat, measured in terms of kilowatts per unit volume. This card-on-board package should probably be producible at a modest cost, complete: wired, housed and powered, and will consist of only three significant field replacement part numbers: the card, the board, and the power supply.

Whereas the invention has been described in terms of a preferred embodiment, changes are possible which still embody the inventive concepts expressed in the claims.

What is claimed is:

1. A distributed array processor system including a plurality of processing nodes for concurrently processing a plurality of data streams, comprising:

an input receiving a plurality of concurrent data streams for processing, each of said data streams having a unique identification tag;

a set of processors, each processor located at a processing node and asynchronously processing its input data to produce output data, each processor receiving the input data independent of any timing control, processing the input data dependent on the unique identification tag of said data and independent of any timing control, and producing the output data independent of any timing control, said output data including a target node address representing a target node to which a data stream is directed, said target node address being produced by the processor based upon the input data to achieve desired subsequent processing at said target node, and each processor including a set of micro-instructions for controlling each said processor independent of any other processor;

a set of buses interconnecting each of said processors to each other each bus including an address bus with lines dedicated to address transfer and a data bus with lines dedicated to data and identification tag transfer;

a set of memories, each being associated with and connected to one of said processors storing intermediate results and status information for each of said data streams utilizing said one processors;

a set of corner controllers, each located at a connection node of said set of buses, interconnecting said set of buses to route the data streams from a source node to a target node, each of said corner controllers operating in response to said target node address; and an output concurrently outputting a plurality of data streams after processing by said set of processors.

2. The distributed array processor of claim 1 further comprising means to couple horizontally adjacent nodes, for creating variable-width data flow paths, to accommodate parallel arithmetic operations.

3. The distributed array processor of claim 1 further comprising:

bus arbitration means for controlling usage of the data and address buses;

means for receiving control information for defining a data flow path for a data stream, said data flow path including a plurality of target nodes; and means for changing said defined data flow path responsive to intermediate results, thereby directing said data stream to an alternate target node.

4. The distributed array processor of claim 1 further comprising:

means for executing an interruptable set of predetermined self-testing algorithms, to ensure that each processor is performing correctly;

means for detecting a faulty processor;

means responsive to said detecting means to take said faulty processor out of service by transferring the control status information and data of the faulty processor to another processor; and means for identifying the location of said faulty processor for replacement.

5. The distributed array processor of claim 1 wherein the set of buses is organized as vertical and horizontal address and data bus sets which intersect at one of said corner controllers; each of said set of processors being interconnected with said corner controllers so that a processor in an addressed horizontal row and located in a vertical column responds to its row address by inputting data corresponding to a column of the vertical address in true-value form, and then outputting the horizontal column address value in bi-polar form for all of the nodes located in its own row including itself.

6. The distributed array processor of claim 1 further comprising positionally variable wiring to create a bi-polar address segment unique to each module.

7. The distributed array processor of claim 1 wherein a module is retained in an idle condition, and further comprising means for activating an idle module responsive to program maintenance requirements.

8. The distributed array processor of claim 1 further comprising peripheral devices and interface means to interface the peripheral devices to provide an input/output to the modules.

9. The distributed array processor of claim 1 further comprising external means including a display for tracing a routing path for a selected data stream, said external means automatically delaying the progress of the data-stream between processing nodes to compensate for the response time of the display.

10. The distributed array processor of claim 9 wherein the external means includes control means for manually controlling the progression of the data stream through its path.

11. A process for addressing 1, 2, 4 or 8 horizontally-adjacent nodes in one of 32 identical circuit cards, each containing 128 identical processors arranged in an array of 8 horizontal rows and 16 vertical columns and interconnected by on-card and off-card buses, comprising the steps of addressing 4,096 ($2^{12}$) identical processors with only 256 ($2^4$) possible address values, by limiting row-of-source to row-of-target transfers to span an odd number of rows;

establishing "bit 0" for on/off-card address-format selection, "bits 1 and 2" for on-card row-pair selection and "bits 3 to 7" for on-card column selection, "bits 1 to 5" for alternative card selection, and "bits 6 and 7" for row-pair selection in the same column of the receiving card;

connecting together the off-card "vertical" address buses of all 32 cards column-by-column;

utilizing the two remaining on-card horizontal address values of "11110" and "11111" to designate, respectively, "external input/output" and "null"; and transferring up to eight concurrent on-card transfers, co-existing with each other and with up to eight other off-card transfers from otherwise idle columns.

\* \* \* \* \*